United States Patent
Hocking

[11] Patent Number: 5,944,446
[45] Date of Patent: *Aug. 31, 1999

[54] INJECTION OF MIXTURES INTO SUBTERRANEAN FORMATIONS

[75] Inventor: Grant Hocking, Golden, Colo.

[73] Assignee: Golder Sierra LLC, Atlanta, Ga.

[ * ] Notice: This patent is subject to a terminal disclaimer.

[21] Appl. No.: 08/432,680

[22] Filed: May 2, 1995

Related U.S. Application Data

[63] Continuation of application No. PCT/AU93/00104, Mar. 15, 1993, abandoned.

[30]    Foreign Application Priority Data

Aug. 31, 1992 [AU] Australia ................................. PL 4399

[51] Int. Cl.⁶ ................................. B09C 1/00; E21B 43/26
[52] U.S. Cl. ............................ 405/128; 166/53; 166/308; 210/747; 588/249; 588/250
[58] Field of Search ............................ 166/53, 66, 177.5, 166/250.01, 250.02, 250.1, 281, 283, 308; 405/52, 128, 270; 588/249, 250, 259; 210/747

[56]    References Cited

U.S. PATENT DOCUMENTS

| | | | |
|---|---|---|---|
| 3,667,545 | 6/1972 | Knight | 166/269 |
| 4,429,647 | 2/1984 | Zinck | 405/128 X |
| 4,901,563 | 2/1990 | Pearson | 166/308 X |
| 4,953,618 | 9/1990 | Hamid et al. | 166/53 X |
| 5,002,127 | 3/1991 | Dalrymple et al. | 166/295 |
| 5,002,431 | 3/1991 | Heymans et al. | 405/128 |
| 5,032,042 | 7/1991 | Schuring et al. | 166/308 X |
| 5,061,119 | 10/1991 | Balthaus et al. | 405/128 |
| 5,103,911 | 4/1992 | Heijnen | 166/308 X |
| 5,133,625 | 7/1992 | Albergo et al. | 405/128 X |
| 5,180,013 | 1/1993 | Abdul | 166/53 X |
| 5,186,255 | 2/1993 | Corey | 166/53 X |
| 5,263,795 | 11/1993 | Corey et al. | 405/128 |
| 5,449,251 | 9/1995 | Daily et al. | 405/128 |

*Primary Examiner*—George Suchfield
*Attorney, Agent, or Firm*—Jones & Askew

[57]    ABSTRACT

This invention relates to an environmental engineering process for injecting a mixture into the ground to act as a containment barrier for fluids or gases or to act as in situ waste remediation process. The process involves pumping a mixture into the ground so that the mixture penetrates from the injection source(s), to form overlapping and/or intersecting horizontal or vertical planar geometries. Control of the geometry of the propagating fracture is made by the down hole outlet design and by interactively modifying mixture composition, injection pressures and flow rates, according to the sequential calculation of the in situ injected geometry by an inverse or tomographic method from monitored response of detection devices.

20 Claims, 5 Drawing Sheets

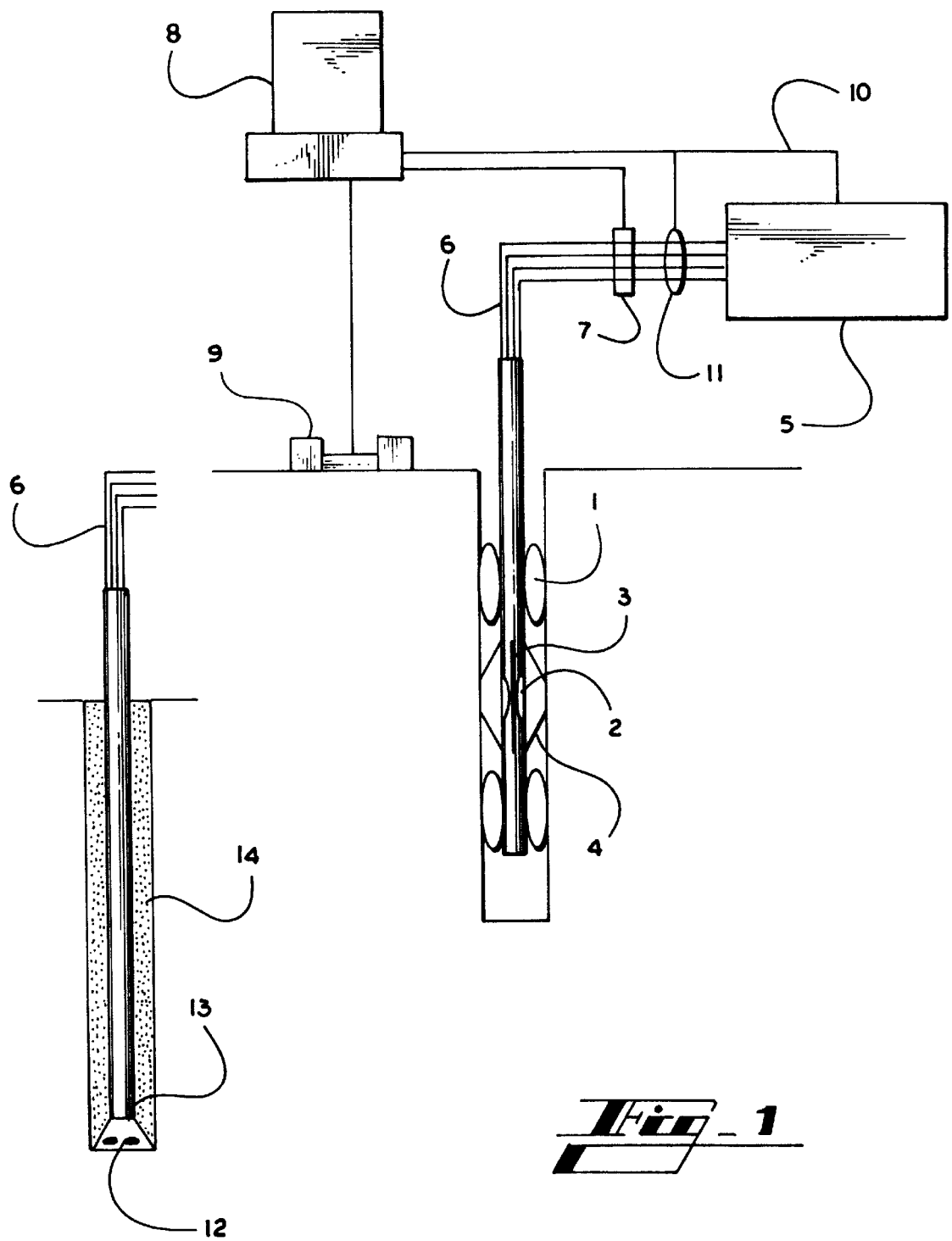
Fig_1

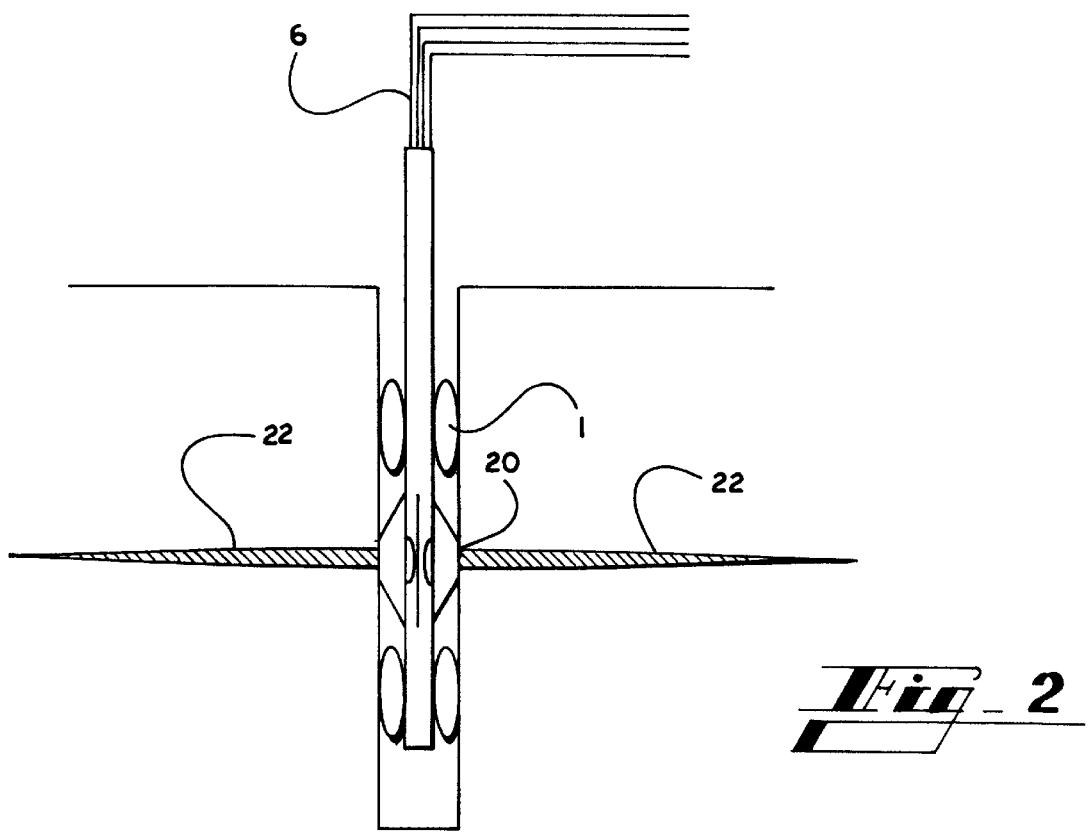
Fig_2
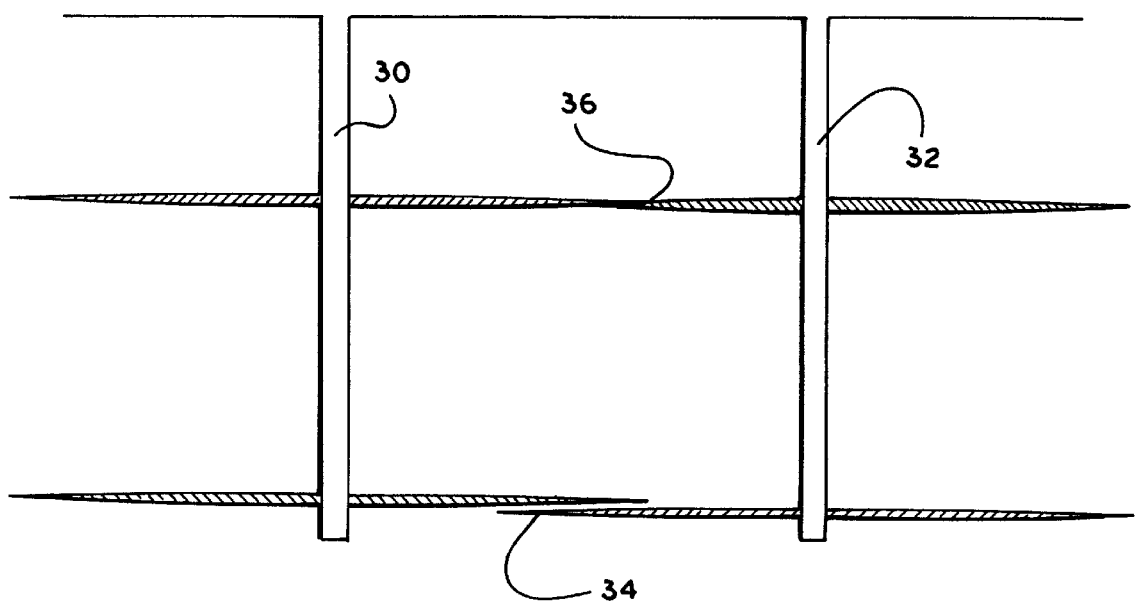
Fig_3

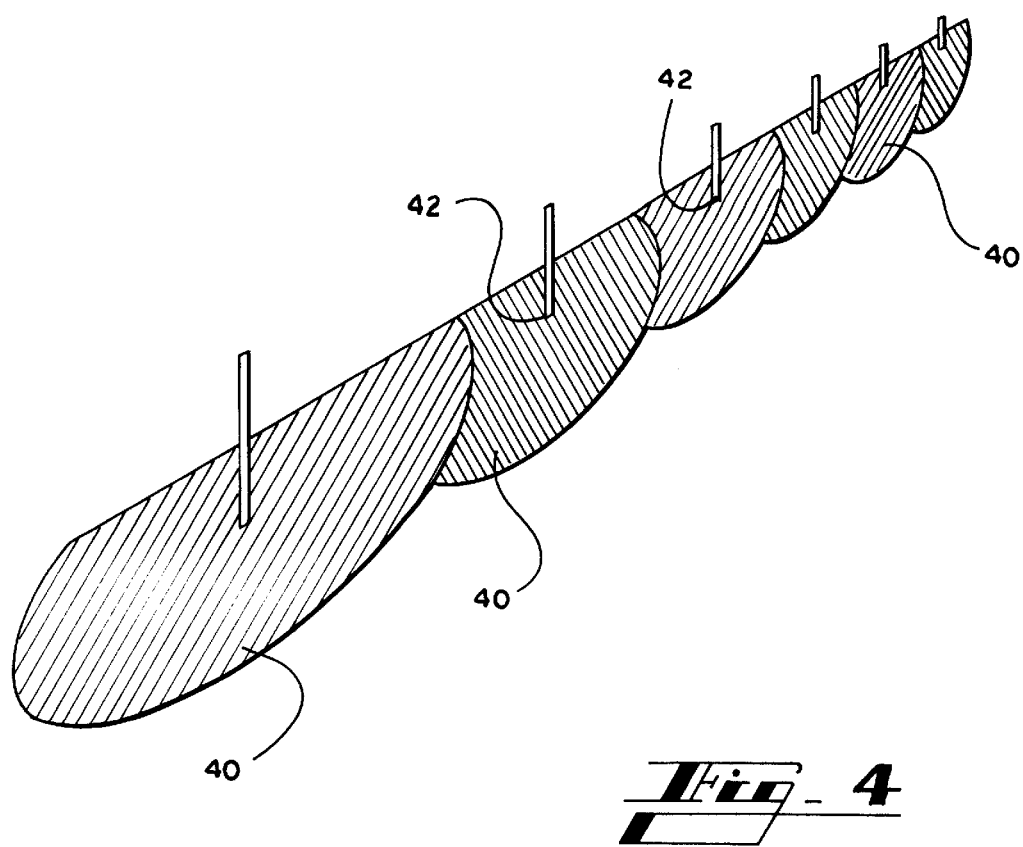
Fig. 4
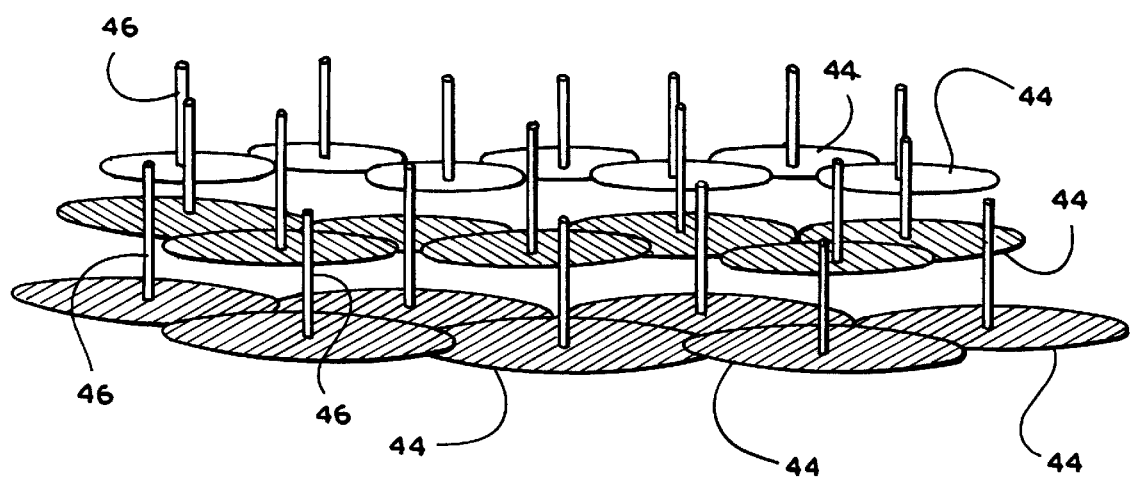

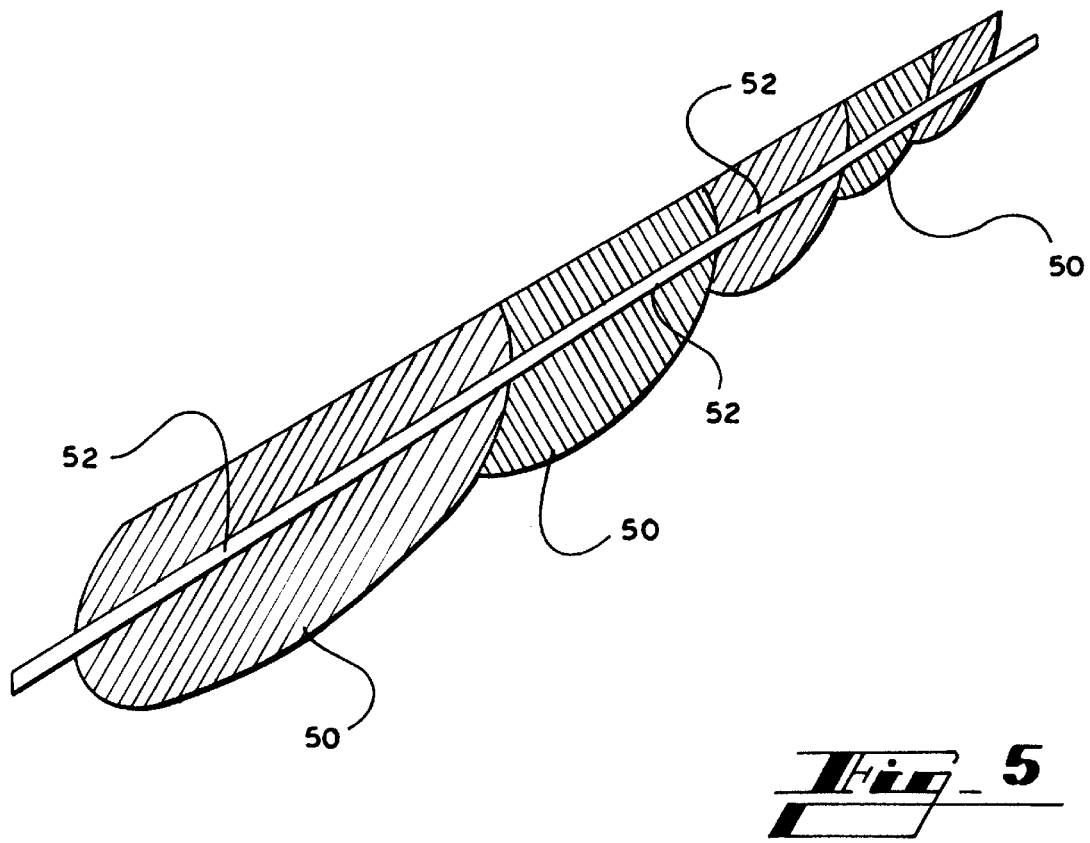
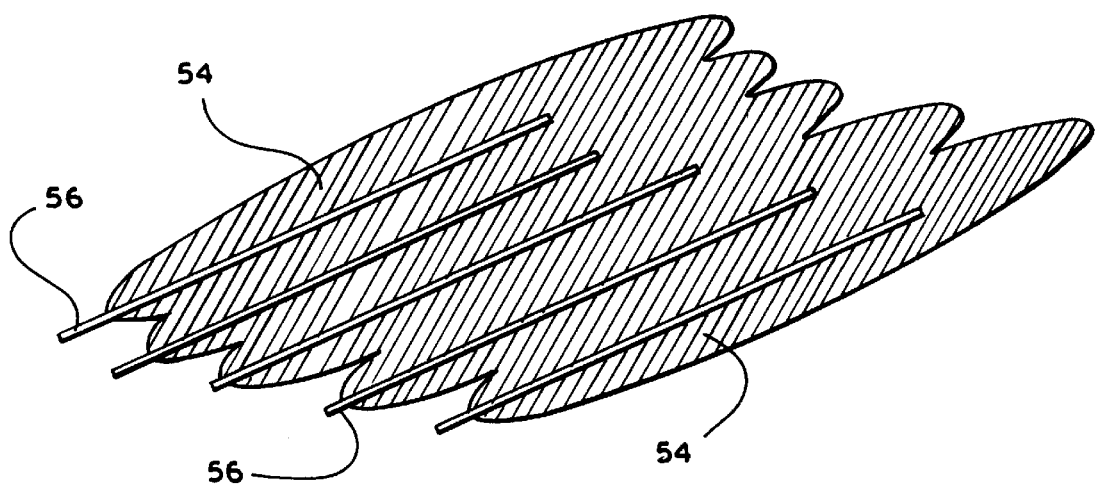
Fig_5

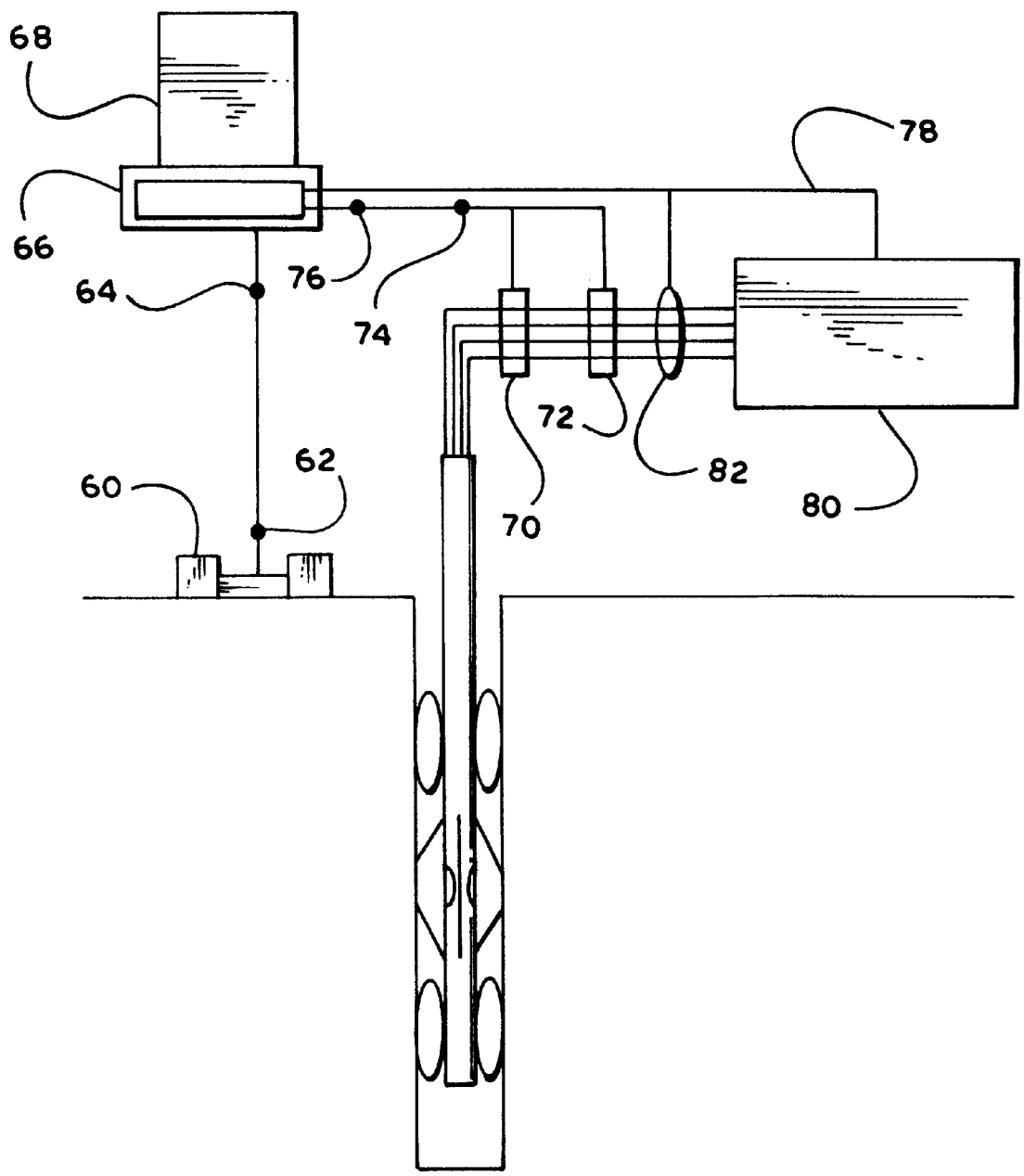
Fig_6

INJECTION OF MIXTURES INTO SUBTERRANEAN FORMATIONS

CROSS-REFERENCE TO RELATED APPLICATIONS

This application is a continuation of International Application No. PCT/AU93/00104, filed Mar. 15, 1993, and now abandoned, which claims priority to Australian Application No. PL 4399, filed Aug. 31, 1992, and now abandoned.

BACKGROUND OF THE INVENTION

This invention relates to a process for injecting a mixture into the ground to act as a containment/isolation barrier for fluids or gases or to act as an in situ waste remediation process either by biological or chemical means.

The contamination of ground water and subterranean formations are serious environmental problems. There are numerous sites containing toxic substances which are spreading in the ground and into ground water systems. Conventional methods of containing the spreading of these contaminants have involved construction of slurry trenches and pumping/withdrawal of ground water.

An object of the present invention is an improved process to contain the spreading of contaminants in the ground and in the ground water systems.

An object of the present invention is an improved process to control the orientation, shape, size and aperture of induced fractures in the ground.

Another object of the present invention is an improved process of delivering oxygen, nutrients and microbes to zones of contaminated ground.

The method of hydrofracing is well known for its use in stimulating petroleum and water wells in consolidated rock formations. The resulting orientation, shape and size of the fractures are not well controlled.

It is well known that many contaminants in the ground can be rendered innocuous by bioxidation. However, the mass transfer of oxygen into the ground is limited by the diffusion of oxygen gas, the permeability of the ground and the solubility of oxygen in water. Aqueous solutions of hydrogen peroxide have been used as a source of oxygen for bioxidation. However, the penetration of the hydrogen peroxide into the ground is limited and the release rates and concentration of oxygen in the ground are poorly controlled.

SUMMARY OF THE INVENTION

The present invention includes pumping a mixture into the ground, so that the injected mixture penetrates from the injection source(s) and controlling the in situ geometry of the injected mixture in the ground by:

1) the shape and type of the injection apparatus,
2) by interactively modifying the injection pressures and flow rates according to the feedback response from detection monitors, and
3) the physical and chemical composition of the mixture.

In one form of the invention the mixture is injected into the ground by a pneumatic or hydraulic operated pressure vessel; while in another form of the invention the mixture is pumped by a slurry type pump into the ground.

In one form of the invention the mixture is injected into the ground through a borehole; while in another form of the invention the mixture is injected through a lance type system.

Isolation of the injected source(s) in the borehole or lanced ground is made by the means of inflatable packers and/or packed earth.

The mixture is injected into the isolated section of the ground by either single or multiple outlet ports. Each outlet port is attached to a separate inflow line in which the injected pressures and flow rates can be controlled independently. Directional vanes and flexible diaphragms may be installed around each outlet port to isolate the section of the borehole wall or ground each outlet port injects into and to assist in control of injecting the mixture into the ground.

In one form of the invention the mixture would consist of clays or chemical mixtures of extremely low permeability. These mixtures would be injected so that their in situ geometry would provide a hydraulic and contaminant barrier (s) to limit the migration of fluids or gases in the ground. In another form of the invention which may or may not be combined with the one previously mentioned, the injected mixture would consist of oxidants and/or microbes and/or nutrients which may promote the in situ remediation of certain contaminants in the ground.

In another form of the invention the injected mixture would consist of material(s) with adsorptive/absorptive properties for various contaminants and thus limit their migration in the ground. For ground containing organic contaminants the mixture in one form would contain activated carbon; while for other contaminants alternate substances such as clays and chemicals would be contained in the mixture. The composition of the injected mixture would be adapted to suit the application and/or geological environment and/or the desired in situ geometry of the injected mixture in the ground.

The mixture in its various forms could be injected either directly or by mixing with water and/or air and injected into the ground either above or below the ground water regime.

Single or multiple injections made in the same borehole or lance at different depths and in neighboring boreholes provide an overlap and/or continuity of the injected mixtures in the ground. Repeated injections in the borehole or lance can extend the injected regime or replenish expended mixture.

In its most common embodiment it is envisioned that various forms of the invention as described in above would be combined to create a complete containment/remediation process for the treatment of contaminated ground.

Other applications for the process may include:
1) the creation of artificial perched water tables, and
2) limiting the up welling of saline waters and providing a contained hydraulic regime for rehabilitation of near surface saline soils.

There are numerous other applications of the invention and the above examples are included to indicate the diversity of the possible applications of the injection process.

The process requires the automatic monitoring of detection devices placed on and/or within the ground around the injection source(s), the monitoring of injection pressures and flow rates; and from inverse calculations the in situ geometry of the injected mixture (size, shape, extent and rate of propagation) is calculated resulting in a computer generated feedback signal to modify the injection pressures and flow rates, and thus develop an injected geometry optimum for the containment or remediation application.

In one form of the invention the detection devices are surface or borehole mounted high precision tiltmeters with an analog or digital output signal depending on the degree of tilt of the device. The tiltmeters are monitored to enable the integration of tilt with time and computation of ground movement. In another form of the invention, the detection devices are electrical probes monitoring the induced voltages from current source electrodes, which are placed in the ground around the injection source(s). In another form of the invention, the detection devices are surface and/or borehole mounted accelerometers providing an output analog or digital signal of ground motion in either two horizontal and/or the vertical direction(s). The accelerometers monitor the seismic response of the ground from active seismic sources, such as sparkers or magnetostrictive type sources placed in the ground around the injection source(s), or from active pulsating of the injected mixture in the ground.

Injection flow rates are monitored by appropriate flow rate devices depending on the mixture being injected and the method of injection. In one form of the invention the flow rate devices are direct in tube flowmeters; while in alternate forms the flow rate devices are external sonic or magnetic flowmeters. Irrespective of the form of the flowmeters, the flow rate devices output an analog or digital signal dependent on the flow rate. Flow rate devices are monitored to enable the injected volumes to be calculated by integrating the flow rates with time. Injection pressures are monitored by appropriate pressure devices either of the fluid, gas or inert type depending on the injected mixture and method of injection. The injection pressure devices output an analog or digital signal dependent on injection pressure.

In the case of tiltmeter detection devices, an inverse method using ground movement influence functions is used to compute the injected mixture in situ geometry. Ground movement influence functions relating the influence of an elementary area of injected mixture lying in a horizontal or inclined plane of a particular thickness to ground tilt and movement can be formulated from the ground deformational behavior. From monitored ground tilts and injected flow rates and volumes, the in situ geometry and the rate of propagation of the injected mixture in the ground can be calculated by an inverse method of the influence functions constrained by the monitored injected flow rates and injected volumes.

In the case of electrical probe detection devices, an inverse and/or tomographic method using ground potential influence functions is(are) used to compute the in situ geometry of the injected mixture. While in the case of accelerometer detection devices, an inverse and/or tomographic method using ground seismic wave influence functions is(are) used to compute the in situ geometry of the injected mixture. For whatever type of detection device, the in situ geometry of the injected mixture must be computed during the injection process to enable a feedback response to the injection system to modify the injected pressures and flow rates.

From the inverse and/or tomographic method described above, the injection pressures and flow rates required to modify the in situ injected geometry are calculated and controlled by feedback signals to the injection system and/or operator. The type of in situ injected geometry required, greater thickness or greater lateral extent or vertical/horizontal propagation, is achieved by appropriate injection pressures and flow rates depending on ground behavior, mixture type and characteristics and injection method. The calculation of these injection pressures and flow rates involves the sequential calculations of the in situ geometry of the injected mixture during the injection process.

An object of the present invention is an improved process to contain the spreading of contaminants in the ground and in the ground water systems.

An object of the present invention is an improved process to control the orientation, shape, size and aperture of induced fractures in the ground.

Another object of the present invention is an improved process of delivering oxygen, nutrients and microbes to zones of contaminated ground.

To assist with understanding the invention, reference will now be made to the accompanying drawings which show one example of the invention.

BRIEF DESCRIPTION OF THE DRAWING

FIG. 1 shows one example of a system for the installation of an injected mixture according to this invention;

FIG. 2 illustrates the form of a near horizontal injected geometry extending radially from a section of the borehole isolated by packers.

FIG. 3 illustrates the method of overlapping and/or intersecting injected geometries to confine or remediate the contaminated ground;

FIG. 4 illustrates the form of intersecting and/or overlapping injected geometries from vertical boreholes.

FIG. 5 illustrates the form of intersecting and/or overlapping injected geometries from horizontal boreholes.

FIG. 6 shows the computer control and monitoring instrumentation to control the injected geometry rate of propagation, its size, shape and extent.

DESCRIPTION OF A PREFERRED EMBODIMENT

Referring to FIG. 1 it can be seen that a vertical borehole is sectioned off by a system of inflatable packers 1, between these packers are the injection outlet ports 2, shown in this example as four ports, with radial isolation vanes 3, and flexible diaphragms 4, for independent control of injection pressures and flow rates in different directions. These injection outlet ports are connected to the pumping system 5 by flow lines 6, with pressure and flow rate monitoring devices 7 mounted on the flow lines and connected to a computer 8, surface or borehole mounted tiltmeters 9 are connected to the computer, and the computer provides a display of the barrier geometry and feedback control 10 to the pumping system 5, and control valves 11, to control pressures and flow rates and thus control the geometry of the injected mixture in the ground. An alternate down the hole injection system is shown with multiple outlet ports 12, connected to the pumping system 5 by flow lines 6, with a flexible flange 13 embedded into the ground by packed earth 14.

The pressures in the injection system are raised to initiate the fracture of the ground thus forming a crack for the mixture to propagate along. The tiltmeters and injection pressures and flow rates are monitored and from inverse calculations of these responses and their integration with time; the rate of propagation, size, shape and extent of the injected regime is determined and the injected geometry is controlled by computer generated feedback response to the operator and the pumping system to modify the injection pressures and flow rates.

Referring to FIG. 2 it can be seen that a region 20 of the borehole is isolated by inflatable packers 1. The mixture is injected into this region 20 by flow lines 6. The injection pressure is raised to initiate a fracture in the borehole wall and injection pressures and flow rates modified to control the rate of propagation and geometry of the in situ injected regime 22. The extent, orientation and thickness of the injected regime 22 can be altered by appropriate variations of injection pressures and flow rates resulting in near horizontal type geometry as shown in FIG. 2.

Referring to FIG. 3 it can be seen that by developing injected geometries at neighboring boreholes 30, 32, either overlapping 34 or intersecting injected regimes 36 can be formed in the ground. Multiple injected regimes at different depths can be formed to enhance the confining or remediation applications of the invention.

Referring to FIG. 4 vertical injected geometries 40, are injected from vertical boreholes 42 to form an overlapping and/or intersecting vertical injected geometry. Horizontal injected geometries 44, are injected from vertical boreholes 46, to form an overlapping and/or intersecting horizontal injected geometry.

Referring to FIG. 5 vertical injected geometries 50, are injected from a horizontal borehole 52, to form an overlapping and/or intersecting vertical injected geometry. Horizontal injected geometries 54, are injected from horizontal boreholes 56, to form an overlapping and/or intersecting horizontal injected geometry.

Referring to FIG. 6 high precision tiltmeters 60 are installed on the surface and/or mounted in boreholes and connected by signal conditioning circuitry 62 and 64 to a high speed analog to digital interface board 66 installed into a field computer 68. Pressure and flow rate monitoring devices 70 and 72 are connected to the computer by signal conditioning circuitry 74 and 76 and the high speed analog to digital interface board. Software installed on the computer automatically scans and monitors these devices and from their response; the software calculates and displays the injected regime's rate of propagation, size, shape and extent and then computes the changes required in pressures and flow rates to achieve a particular injected geometry. These changes in pressures and flow rates are displayed to the operator and automatically interfaced 78 to the pumping system 80 and control valves 12 by feedback analog signals from the computer's analog to digital interface board 66. These signals modify the pumping system to achieve the particular injected geometry and/or enable the operator to manually override the process.

The claims defining the invention are as follows:

1. A method for remediating underground contamination, comprising the steps of:
   extending a flow line into an elongate hole extending below the surface of the earth, wherein the flow line defines a passage that extends below the surface of the earth, the flow line further defines an outlet from the passage that is below the surface of the earth and communicates with the hole, and the flow line further defines an inlet to the passage;
   forcing a fluid into the inlet so that the fluid flows out of the outlet to form a fracture below the surface of the earth, wherein the fluid flows into the fracture and contains at least a remediating material that is operative while within the fracture to remediate underground contamination; and
   directing the fluid with a member proximate to the outlet and extending away from the outlet.

2. The method of claim 1, wherein the member comprises a vane.

3. The method of claim 2, wherein the vane extends radially from the flow line and the outlet.

4. The method of 2, wherein:
   the outlet is a first outlet and the flow line further defines a second outlet through which fluid flows; and
   the vane at least partially separates the first outlet from the second outlet.

5. The method of claim 1, wherein the member comprises a diaphragm.

6. The method of claim 5, further comprising the step of providing a first isolating object extending from the flow line to obstruct a portion of the hole and a second isolating object extending from the flow line to obstruct another portion of the hole so that a section of the hole is defined between the first isolating object and the second isolating object, wherein the outlet and the diaphragm are positioned in the section of the hole.

7. The method of claim 6, wherein the first isolating object is a first inflatable packer and the second isolating object is a second inflatable packer.

8. The method of claim 5, further comprising the step of providing a vane proximate to the outlet and extending away from the outlet for directing the fluid.

9. The method of claim 8, wherein the diaphragm and the vane are radially displaced from one another about the flow line and are in a common plane.

10. The method of claim 9, further comprising the step of providing a first isolating object extending from the flow line to obstruct a portion of the hole and a second isolating object extending from the flow line to obstruct another portion of the hole so that a section of the hole is defined between the first isolating object and the second isolating object, wherein the outlet, the diaphragm and the vane are positioned in the section of the hole.

11. The method of 1, wherein:
    the flow line is a first flow line, the passage is a first passage, the outlet is a first outlet, and the inlet is a first inlet; and
    the method further comprises the steps of:
       extending a second flow line into the hole, wherein the second flow line defines a second passage that extends below the surface of the earth, the second flow line further defines a second outlet from the second passage that is below the surface of the earth and communicates with the hole, and the second flow line further defines a second inlet to the second passage; and
       forcing the fluid into the second inlet so that the fluid flows out of the second outlet; and
    the member at least partially separates the first outlet from the second outlet.

12. The method of 11, wherein the member is a first member and the method further comprises a step of directing the fluid with a second member proximate to the second outlet and extending away from the second outlet.

13. The method of claim 12, wherein the first member and the second member are radially displaced from one another about the flow lines and are in a common plane.

14. The method of claim 13, wherein the first and second members are radial vanes.

15. The method of claim 13, wherein the first and second members are flexible diaphragms.

16. A method for remediating underground contamination, comprising the steps of:
    forcing a mixture into a passage that extends below the surface of the earth; and
    providing an outlet from the passage below the surface of the earth, so that the mixture flows from the passage to form a fracture in the earth, wherein the mixture flows into the fracture and contains at least a material selected from materials having adsorptive or absorptive properties, so that the mixture within the fracture is available to remediate underground contamination.

17. The method of claim 11, wherein the material comprises activated carbon.

18. A method for remediating underground contamination comprising the steps of:

forcing fluid from a source into a fracture in the ground so that the fracture propagates, wherein the fluid contains at least a remediating material that is operative while within the fracture to remediate underground contamination; and monitoring the propagation of a fracture in the ground to quantify the extent of the remediating material in the ground, comprising the steps of:

energizing at least one electrode proximate to the source; and monitoring a plurality of electrical probes that are in electrical communication with ground to at least partially determine the propagation of the fracture.

19. The method of claim 11, wherein the remediating material is selected from materials having adsorptive or absorptive properties.

20. The method of claim 1, wherein the remediating material comprises activated carbon.

* * * * *